United States Patent
Aoki et al.

(10) Patent No.: US 11,045,803 B2
(45) Date of Patent: Jun. 29, 2021

(54) LIQUID DELIVERY METHOD, AND DETECTION SYSTEM AND DETECTION APPARATUS FOR IMPLEMENTATION OF THIS METHOD

(71) Applicant: Konica Minolta, Inc., Tokyo (JP)

(72) Inventors: Youichi Aoki, Toda (JP); Takanori Murayama, Tachikawa (JP)

(73) Assignee: KONICA MINOLTA, INC., Tokyo (JP)

( * ) Notice: Subject to any disclaimer, the term of this patent is extended or adjusted under 35 U.S.C. 154(b) by 228 days.

(21) Appl. No.: 16/074,022

(22) PCT Filed: Feb. 2, 2016

(86) PCT No.: PCT/JP2016/053077
§ 371 (c)(1),
(2) Date: Jul. 30, 2018

(87) PCT Pub. No.: WO2017/134746
PCT Pub. Date: Aug. 10, 2017

(65) Prior Publication Data
US 2019/0039067 A1 Feb. 7, 2019

(51) Int. Cl.
*B01L 3/02* (2006.01)
*G01N 1/00* (2006.01)
(Continued)

(52) U.S. Cl.
CPC ....... *B01L 3/502715* (2013.01); *B01L 3/0217* (2013.01); *B01L 3/50273* (2013.01);
(Continued)

(58) Field of Classification Search
None
See application file for complete search history.

(56) References Cited

U.S. PATENT DOCUMENTS

2002/0192701 A1* 12/2002 Adey .................... B01L 3/5085
435/6.11
2003/0157503 A1* 8/2003 McGarry .......... B01L 3/502723
435/6.11
(Continued)

FOREIGN PATENT DOCUMENTS

JP  2012159358 A    8/2012
JP  2013185967   *  9/2013  ............. G01N 35/10
(Continued)

OTHER PUBLICATIONS

JP2013185967 Machine Translation from espacenet; accessed May 2, 2020 (Year: 2013).*
(Continued)

*Primary Examiner* — Jill A Warden
*Assistant Examiner* — Brittany I Fisher
(74) *Attorney, Agent, or Firm* — Lucas & Mercanti, LLP

(57) ABSTRACT

Aiming to provide a method capable of reciprocatingly delivering various liquids without bringing air into a microchannel, a detection system and a detection apparatus for implementation of this method. In order to achieve at least one of the above aims, provided is a method of inserting a pipette tip into a liquid injection portion of a detection chip including: the microchannel; the liquid injection portion connected to one end of the microchannel; and a reservoir connected to the other end of the microchannel, injecting and aspirating the liquid by the pipette tip, and reciprocatingly delivering the liquid into the microchannel. At this time, the following steps are executed in this order, the steps including: inserting the pipette tip into the liquid injection portion up to a position at which an end of the pipette tip comes below a liquid level when the liquid is injected into the liquid injection portion; injecting the liquid from the pipette tip into the liquid injection portion; generating a negative pressure in the liquid injection portion to raise the (Continued)

level of the liquid in the liquid injection portion; and performing either aspiration of the liquid in the liquid injection portion by the pipette tip, or injection of the liquid into the liquid injection portion by the pipette tip and aspiration of the liquid inside the liquid injection portion.

6 Claims, 9 Drawing Sheets

(51) Int. Cl.
G01N 35/10 (2006.01)
G01N 21/11 (2006.01)
G01N 1/14 (2006.01)
G01N 21/03 (2006.01)
G01N 21/64 (2006.01)
B01L 3/00 (2006.01)

(52) U.S. Cl.
CPC ............... *G01N 1/00* (2013.01); *G01N 1/14* (2013.01); *G01N 21/11* (2013.01); *G01N 21/648* (2013.01); *G01N 35/10* (2013.01); *B01L 3/0275* (2013.01); *B01L 2200/026* (2013.01); *B01L 2200/027* (2013.01); *B01L 2200/0684* (2013.01); *B01L 2300/044* (2013.01); *B01L 2300/0809* (2013.01); *B01L 2400/0487* (2013.01); *B01L 2400/0694* (2013.01); *G01N 2021/0346* (2013.01); *G01N 2021/6482* (2013.01)

(56) References Cited

U.S. PATENT DOCUMENTS

| | | | | |
|---|---|---|---|---|
| 2004/0050861 A1* | 3/2004 | Lisec | ...................... | B01L 3/022 222/57 |
| 2012/0156800 A1* | 6/2012 | Aoki | ..................... | G01N 21/648 436/180 |
| 2013/0277457 A1* | 10/2013 | Mizuno | ................. | B05C 5/0233 239/337 |
| 2013/0337432 A1* | 12/2013 | Cook | ........................ | B65B 1/04 435/2 |
| 2014/0137983 A1* | 5/2014 | Tu | ....................... | B05B 11/0056 141/113 |
| 2015/0151295 A1* | 6/2015 | Kimura | ............. | B01L 3/502738 435/289.1 |

FOREIGN PATENT DOCUMENTS

| | | |
|---|---|---|
| JP | 5545233 B2 | 7/2014 |
| WO | 97/44671 A1 | 11/1997 |
| WO | 2011027851 A1 | 3/2011 |
| WO | 2012172992 A1 | 12/2012 |
| WO | 2015064441 A1 | 5/2015 |

OTHER PUBLICATIONS

Extended European Search Report dated Oct. 19, 2018 from corresponding European Application No. 16889236.2.
International Search Report dated Apr. 19, 2016 for PCT/JP2016/053077 and English translation.

* cited by examiner

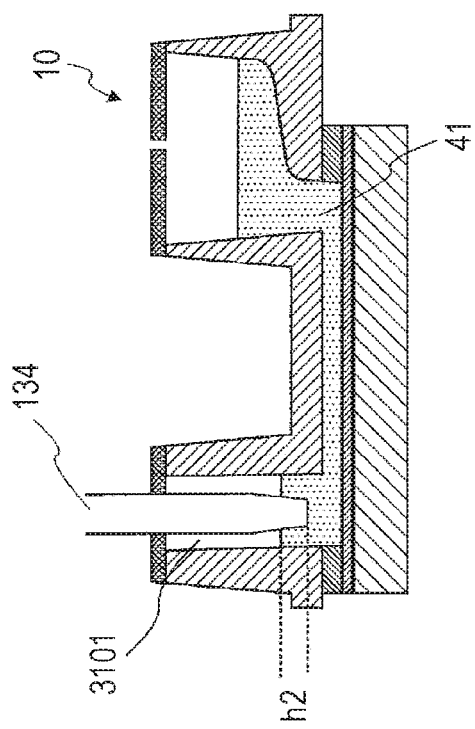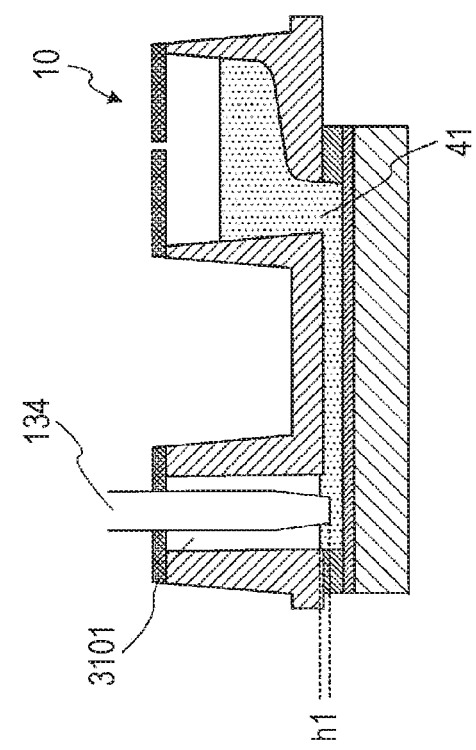

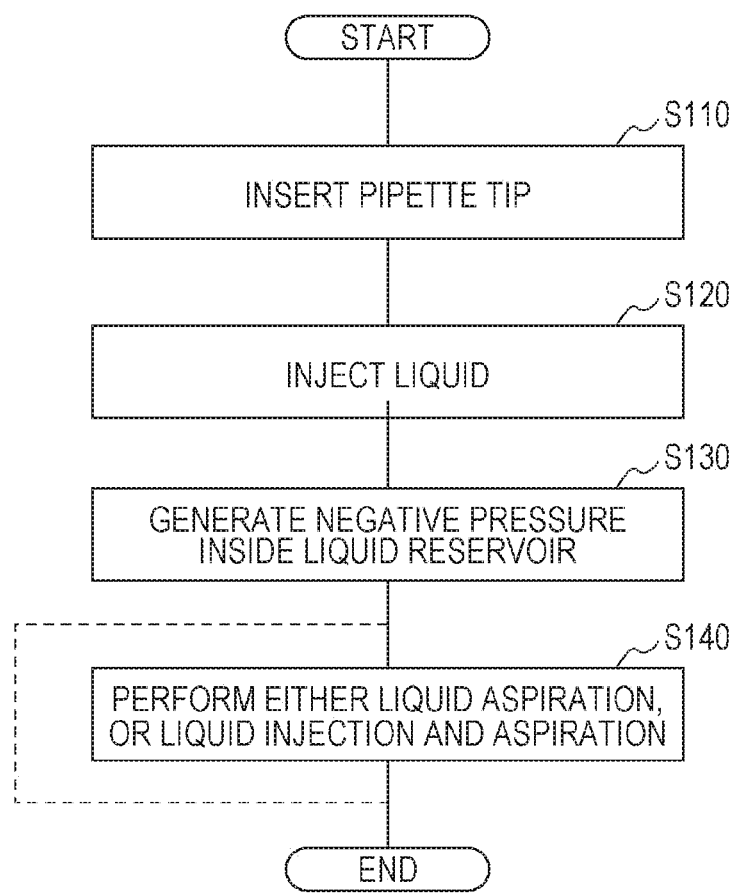

LIQUID DELIVERY METHOD, AND DETECTION SYSTEM AND DETECTION APPARATUS FOR IMPLEMENTATION OF THIS METHOD

CROSS REFERENCE TO RELATED APPLICATION

This Application is a 371 of PCT/JP2016/053,077 filed on Feb. 2, 2016 which is incorporated herein by reference.

TECHNICAL FIELD

The present invention relates to a liquid delivery method for supplying a liquid to a microchannel, and a detection system and a detection apparatus for implementation of the method.

BACKGROUND ART

Biochemical tests include the use of biochemical reactions such as an antigen-antibody reaction. For example, a fluorescence immunoassay (hereinafter also referred to as "FIA") allows reaction of a detection target substance (antigen) with a labeling substance containing a fluorescent substance. Thereafter, excitation light is applied to the detection target substance labeled with the labeling substance, and fluorescence emitted from the fluorescent substance is detected. Then, the amount of the detection target substance is specified from the intensity of the detected fluorescence or the like. Among such FIAs, there is a known method of surface plasmon-field enhanced fluorescence spectroscopy (hereinafter also referred to as "SPFS"), as a method capable of performing particularly highly sensitive detection of a detection target substance.

SPFS immobilizes, on a metal film, a first capture agent (for example, a primary antibody) capable of specifically binding to a detection target substance, so as to form a reaction field for capturing the detection target substance. The reaction field is usually formed as a microchannel. Then, a solution containing the detection target substance is delivered to the channel (reaction field) so as to bind the detection target substance to the first capture agent. Subsequently, a second capture agent (for example, a secondary antibody) labeled with a fluorescent substance is delivered to the channel, so as to further bind the second antibody to the detection target substance bound to the primary antibody. That is, the detection target substance is indirectly labeled with a fluorescent substance. When the excitation light is applied to the metal film in this state, the fluorescent substance is excited by localized field light enhanced by surface plasmon resonance (hereinafter also referred to as "SPR") and emits fluorescence. Then, the detection target substance can be detected by detecting the fluorescence emitted by the fluorescent substance.

Here, in the case of using a specimen containing only a minimal amount of detection target substance, reciprocating delivery of the specimen to the channel makes it possible to increase the chances of contact between the detection target substance and the first capture agent, leading to achievement of binding of a sufficient amount of the detection target substance to the first capture agent. Similarly, it is also preferable to reciprocate a washing agent for washing the channel and the second capture agent. In a case, however, where air is supplied together with a specimen (liquid 500) containing a detection target substance 501 to the microchannel 41 as illustrated in the schematic diagram of FIG. 8, for example, the bubble 510 would cover the first capture agent 502, hindering the binding of the detection target substance 501 to the first capture agent 502. The presence of the bubble 510 like this would also hinder sufficient washing of the microchannel 41 and sufficient binding of the second capture agent.

Against this, there is a proposed countermeasure of adjusting the timing of injection and aspiration of the liquid when reciprocatingly delivering various liquids such as a specimen, a washing liquid, and a second antibody to the microchannel (Patent Literature 1).

CITATION LIST

Patent Literature

Patent Literature 1: WO 2011/027851 A

SUMMARY OF INVENTION

Technical Problem

In Patent Literature 1, as illustrated in FIG. 9A, various liquids 500 are supplied into a liquid injection portion 3101 by a pipette tip 134 so as to supply the various liquids 500 into the microchannel 41. Moreover, as illustrated in FIG. 9B, the liquid 500 in the liquid injection portion 3101 is aspirated by the pipette tip 134 so as to allow the liquid 500 to flow in the microchannel 41 in a direction opposite to the direction at the time of liquid injection. Then, injection and aspiration of the liquid 500 is repeated to allow reciprocating delivery of the liquid 500 into the microchannel 41. In this method, however, has a problem as illustrated in FIG. 9B, that air easily enters the pipette tip 134 when the liquid 500 is aspirated, and this would cause the air to enter the microchannel 41 when the liquid 500 is injected again by the pipette tip 134. FIG. 9C is a partially enlarged view of a region indicated by a broken line in FIG. 9B. As illustrated in FIG. 9C, it is difficult to level the liquid level 500A in the liquid injection portion 3101 after the liquid 500 is supplied. This is likely to generate a gap between a liquid level 10A and the end of the pipette tip 134. When the liquid 500 is aspirated in this state, air is also aspirated together with the liquid 500. In short, it is difficult to sufficiently suppress the entry of air into the microchannel of a detection chip even with adjustment of the timing of injection and aspiration of the liquid as described in Patent Literature 1.

To overcome this problem, it is desirable to provide a liquid delivery method capable of reciprocating delivery of liquids into a microchannel without bringing air into the microchannel of a detection chip, and a detection system and a detection apparatus for implementation of this method.

Solution to Problem

The inventors of the present invention have found, in a mode in which a pipette tip is inserted into a liquid injection portion of a detection chip and the liquid is injected and aspirated to reciprocatingly deliver the liquid into the microchannel, that with generation of a negative pressure on the liquid injection portion after injecting the liquid, it is possible to raise the level of the liquid within the liquid injection portion, leading to suppression of aspiration of air at the time of aspiration of the liquid.

That is, a liquid delivery method according to an embodiment of the present invention is a liquid delivery method of first inserting a pipette tip into a liquid injection portion of a detection chip including: a microchannel; the liquid injection portion connected to one end of the microchannel for injecting a liquid; and a reservoir connected to the other end of the microchannel for temporarily storing the liquid, the insertion being performed to achieve a hermetically sealed state of the liquid injection portion, then injecting and aspirating the liquid by the pipette tip to reciprocatingly deliver the liquid into the microchannel. At this time, the following steps are executed in this order, the steps including: inserting the pipette tip into the liquid injection portion up to a position at which an end of the pipette tip comes below a liquid level when the liquid is injected into the liquid injection portion; injecting the liquid from the pipette tip into the liquid injection portion; generating a negative pressure in the liquid injection portion to raise the level of the liquid in the liquid injection portion; and performing either aspiration of the liquid in the liquid injection portion by the pipette tip, or injection of the liquid into the liquid injection portion by the pipette tip and aspiration of the liquid inside the liquid injection portion.

A detection system according to an embodiment of the present invention is a detection system including: a detection chip including a microchannel, a liquid injection portion connected to one end of the microchannel for injecting a liquid, and a reservoir connected to the other end of the microchannel for temporarily storing the liquid; a pipette tip for injecting the liquid into the liquid injection portion and aspirating the liquid from the liquid injection portion; and a liquid delivery pump drive mechanism for controlling injection and aspiration of the liquid by the pipette tip, in which the pipette tip is inserted to achieve a hermetically sealed state inside the liquid injection portion and achieve a state where an end of the pipette tip comes below a level of the liquid injected into the liquid injection portion, and the liquid delivery pump drive mechanism raises the pipette tip in the axial direction while maintaining the hermetically sealed state inside the liquid injection portion after injecting the liquid from the pipette tip to the liquid injection portion, so as to raise the level of the liquid in the liquid injection portion, and then, performs either aspiration of the liquid from the liquid injection portion by the pipette tip, or injection of the liquid into the liquid injection portion by the pipette tip and aspiration of the liquid inside the liquid injection portion.

Moreover, a detection apparatus according to an embodiment of the present invention is a detection apparatus including: a chip holder that can hold a detection chip including a microchannel, a liquid injection portion connected to one end of the microchannel for injecting a liquid, and a reservoir connected to the other end of the microchannel for temporarily storing the liquid; a pipette tip for injecting the liquid into the liquid injection portion of the detection chip held by the chip holder and aspirating the liquid from the liquid injection portion; and a liquid delivery pump drive mechanism for controlling injection and aspiration of the liquid by the pipette tip, in which the pipette tip is inserted to achieve a hermetically sealed state inside the liquid injection portion and achieve a state where an end of the pipette tip comes below a level of the liquid injected into the liquid injection portion, and the liquid delivery pump drive mechanism raises the pipette tip in the axial direction while maintaining the hermetically sealed state in the liquid injection portion after injecting the liquid from the pipette tip to the liquid injection portion, so as to raise the level of the liquid in the liquid injection portion, and then, performs either aspiration of the liquid from the liquid injection portion by the pipette tip, or injection of the liquid into the liquid injection portion by the pipette tip and aspiration of the liquid inside the liquid injection portion.

Advantageous Effects of Invention

With the liquid delivery method and the detection apparatus according to the present invention, it is possible to perform reciprocate delivery of liquids into the microchannel without bringing air into the microchannel.

BRIEF DESCRIPTION OF DRAWINGS

FIGS. 3A and 3B are schematic diagrams illustrating a liquid delivery method according to an embodiment of the present invention.

FIG. 4 is a flowchart of a liquid delivery method according to an embodiment of the present invention, being a flowchart illustrating an exemplary operation procedure of a detection apparatus.

DESCRIPTION OF EMBODIMENTS

Hereinafter, an embodiment of the present invention will be described below with reference to the drawings. Note that while the following description includes description of a detection chip used for SPFS and an SPFS apparatus (detection apparatus or detection system) given as a representative example of a detection chip, the detection chip and the detection apparatus of the present invention are not limited the description.

Figure 1:
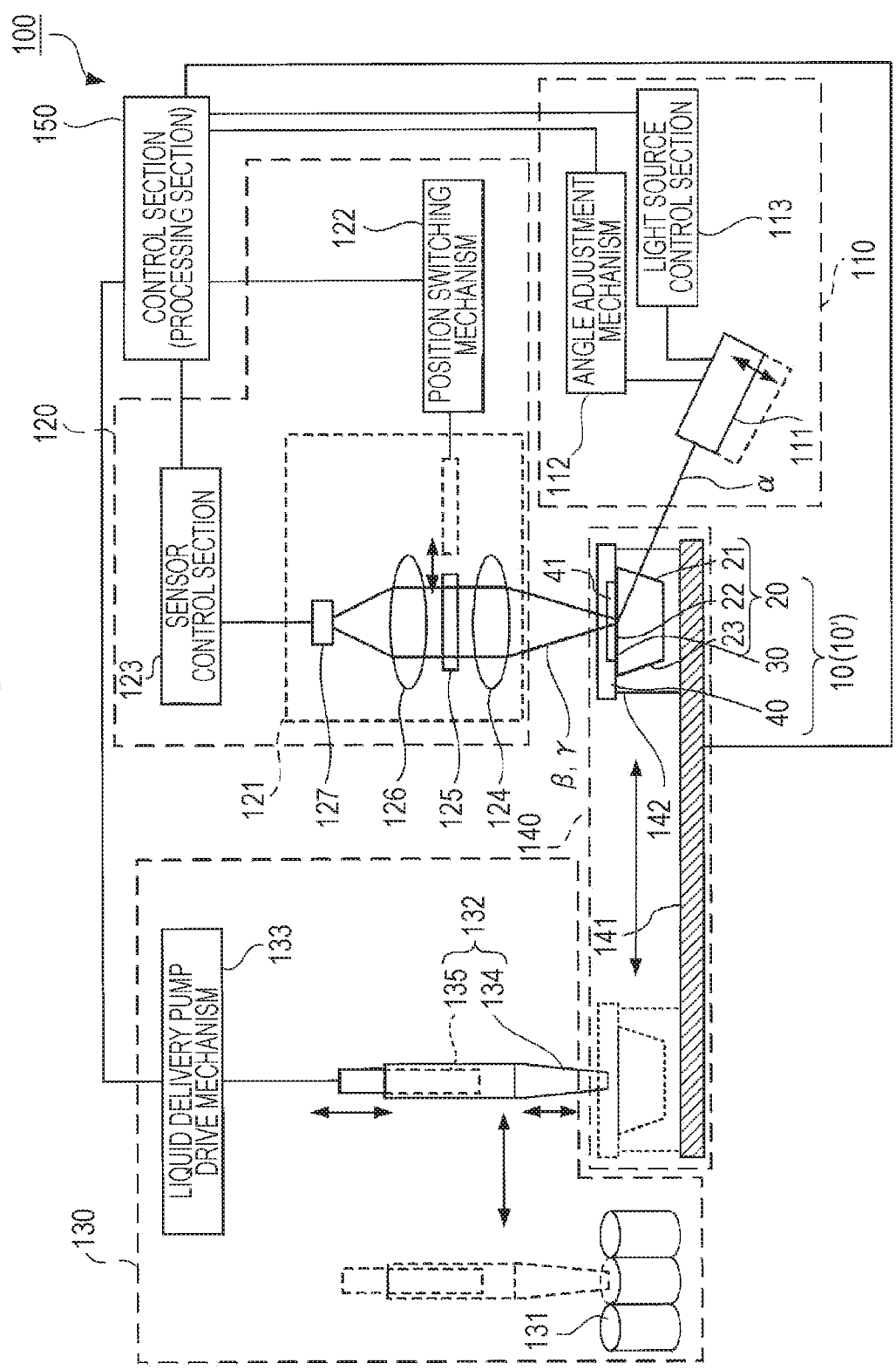
FIG. 1 is a schematic diagram illustrating a configuration of a detection apparatus (SPFS apparatus) according to an embodiment of the present invention.

FIG. 1 is a schematic diagram illustrating a configuration of an SPFS apparatus 100 (detection system) according to an embodiment of the present invention. As illustrated in FIG. 1, the SPFS apparatus 100 includes an excitation light emission unit 110, a fluorescence detection unit 120, a liquid delivery unit 130, a conveyance unit 140, and a control section 150. The SPFS apparatus 100 emits excitation light α in a state where a detection chip 10 is held by a chip holder 142 of a conveyance unit 140 to generate surface plasmon resonance in a metal film 30 of the detection chip 10 so as to generate localized field light based on the surface plasmon resonance. Then, a fluorescent substance present on the metal film 30 is excited by the localized field light to detect fluorescence β emitted from the fluorescent substance, so as to measure the presence or absence and amount of the detection target substance in the specimen. Note that the detection chip 10 is held by the chip holder of the detection apparatus in the present embodiment and the detection chip 10 is detachable from the detection apparatus.

Hereinafter, the detection chip, the detection system, and the detection apparatus used in the present embodiment will be described first, then a method of delivering various liquids to the detection chip and a detection method of a detection target substance using the detection apparatus will be described.

(Detection Chip, Detection System, and Detection Apparatus)

Figure 2:
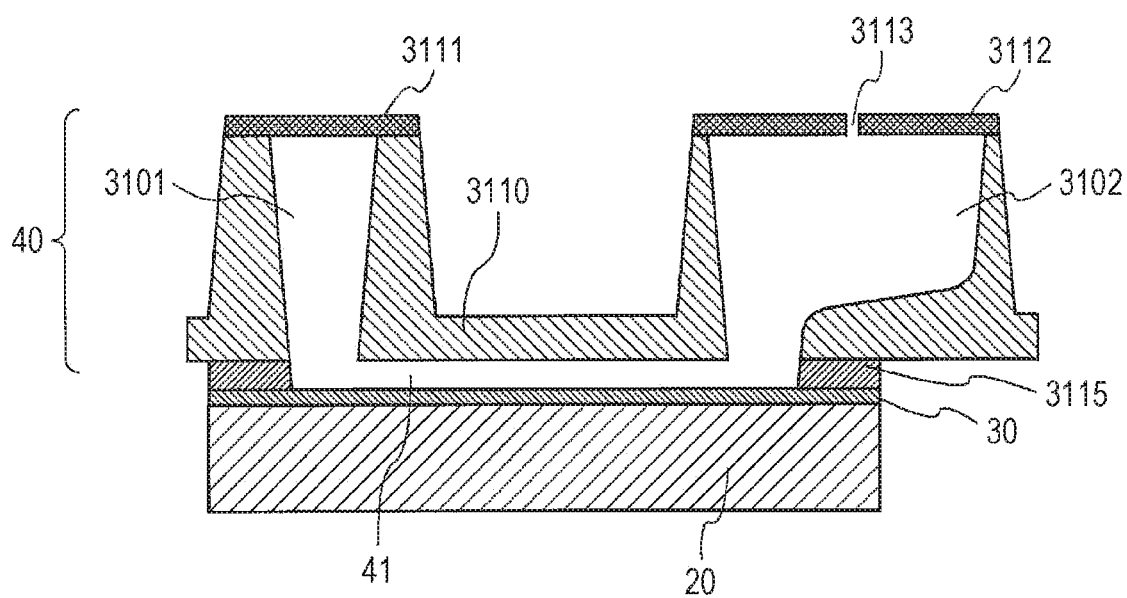
FIG. 2 is a partially enlarged view illustrating a portion of a detection chip of a detection apparatus according to an embodiment of the present invention.

As illustrated in FIG. 1, the detection chip 10 of the present embodiment includes: a prism 20 having an incident surface 21, a film forming surface 22, and an emission surface 23; a metal film 30 formed on the film forming surface 22 of the prism 20; and a channel lid 40 arranged on the film forming surface 22 or the metal film 30 of the prism 20. FIG. 2 illustrates a longitudinal sectional view of the detection chip 10 at an angle different from that the angle of FIG. 1. As illustrated in FIG. 2, the channel lid 40 includes a recess on a surface facing the metal film 30. Then, a space surrounded by the metal film 30 and the channel lid 40 serves as a microchannel 41 used for reciprocatingly delivering the liquid 500 (for example, a specimen), a liquid injection portion 3101 for injecting the liquid 500, and a reservoir 3102 for temporarily storing the liquid 500.

Here, the channel lid 40 of the present embodiment includes: a frame 3110 having a recess corresponding to the liquid injection portion 3101, the microchannel 41, and the reservoir 3102 and having an opening at each of an upper portion of the liquid injection portion 3101 and an upper portion of the reservoir 3102; a liquid injection portion covering sheet 3111 covering the upper portion of the liquid injection portion 3101; and a reservoir covering sheet 3112 covering the upper portion of the reservoir 3102.

In the present embodiment, the frame 3110 is formed of a material transparent to light (for example, fluorescence β and plasmon scattered light γ). Alternatively, a portion of the frame 3110 may be formed of a material opaque to light as long as it does not obstruct the extraction of light in the detection method described below. Examples of materials that are transparent to light include resins. Moreover, while the channel lid 40 is adhered to the metal film 30 via an adhesive layer 3115 such as a double-sided tape or an adhesive in the present embodiment, the channel lid 40 may be joined to the metal film 30 or the prism 20 of the detection chip 10 by laser welding, ultrasonic welding, crimping using a clamp member, or the like.

Meanwhile, the liquid injection portion covering sheet 3111 is a sheet that allows insertion of the pipette tip 134 and that enables the liquid injection portion 3101 to be in a hermetically sealed state by coming into close contact with an outer periphery of the pipette tip 134 when the pipette tip 134 is inserted. Note that "the liquid injection portion 3101 being in a hermetically sealed state" in the present specification means a state in which the liquid injection portion 3101 is not in direct communication with the outside. The liquid injection portion covering sheet 3111 can be a sheet including two layers (not illustrated) of, for example, an elastic sheet and an adhesive sheet. In addition, the liquid injection portion covering sheet 3111 may have a fine through hole through which the pipette tip 134 is inserted. In the present embodiment, the liquid injection portion covering sheet 3111 includes an initial hole having an outer diameter of 1.2 mm.

The elastic sheet can be, for example, a polyurethane sheet having a tensile elastic constant of 0.05 GPa to 2 GPa, a tensile elongation at break of 200% to 2000%, and a tear strength of 80 mN to 3000 mN. The sheet, however, is not limited to the polyurethane sheet as long as it can come in close contact with the outer periphery of the pipette tip 134 sheet when the pipette tip 134 is inserted. Examples of elastic sheets other than polyurethane sheet include a sheet formed of low density polyethylene (LDPE), linear low density polyethylene (LLDPE), medium density polyethylene (HDPE), nylon, non-stretched polypropylene (CPP), ethylene-vinyl alcohol copolymer (EVOH), silicone, polyvinyl alcohol (PVA), polyvinyl chloride (PVC), or the like. The thickness of the elastic sheet is not particularly limited, and may be about 100 μm, for example. Moreover, the adhesive sheet is not particularly limited as long as it is formed of a material capable of sticking the elastic sheet to the frame 3110.

Meanwhile, the reservoir covering sheet 3112 is only required to be a sheet having a vent 3113 (illustrated in FIG. 2) for adjusting the pressure within a space formed by the metal film 30 and the channel lid 40 (space formed by the liquid injection portion 3101, the microchannel 41, and the reservoir 3102). The material of the reservoir covering sheet 3112 is not particularly limited and can be formed of the material similar to the liquid injection portion covering sheet 3111 described above.

Here, the first capture agent is immobilized to the metal film 30 in the microchannel 41. The first capture agent is a substance having a recognition site for specifically binding with a detection target substance in the specimen. When the first capture agent is immobilized in the microchannel 41, the detection target substance is selectively bound to the first capture agent when the specimen is reciprocatingly delivered in the microchannel 41. In other words, the detection target substance is arranged in the microchannel 41. This makes it possible to detect the detection target substance as described below. Here, the type of the first capture agent immobilized on the metal film 30 is not particularly limited as long as it has a recognition site for specifically binding to the detection target substance.

Moreover, the width and the height of the microchannel 41 are not particularly limited, and are appropriately selected depending on the use of the detection chip 10 or the like.

Meanwhile, as illustrated in FIGS. 3A and 3B, the pipette tip 134 is inserted into the liquid injection portion 3101 formed by the metal film 30 and the channel lid 40. Then, the liquid 500 is injected into the liquid injection portion 3101 by the pipette tip 134, or the liquid 500 in the liquid injection portion 3101 is aspirated by the pipette tip 134, so as to reciprocatingly deliver the liquid 500 inside the microchannel 41. The volume and shape of the liquid injection portion 3101 are appropriately selected in accordance with the shape of the pipette tip 134. Note that the present embodiment raises the pipette tip 134 in the axial direction to generate a negative pressure in the liquid injection portion 3101 at reciprocating delivery of the liquid 500, as will be described below. Therefore, it is preferable that the inner diameter of the liquid injection portion 3101 is within an appropriate range with respect to the outer diameter of the pipette tip 134. In the present embodiment, the inner diameter of the liquid injection portion 3101 is set to 10 mm or less, and the outer diameter of the pipette tip 134 is set to 1 mm or more and less than 10 mm. In this specification, the inner diameter of the liquid injection portion 3101 refers to a maximum value of the diameter on the inner peripheral side of the liquid injection portion 3101, and the cross section of the liquid injection portion 3101 need not be circular. Moreover, the outer diameter of the pipette tip 134 refers to a maximum value of the diameter on the outer peripheral side of the pipette tip 134, and the cross section of the pipette tip 134 need not be circular.

As illustrated in FIGS. 3A and 3B, the liquid 500 flows into the reservoir 3102 formed by the metal film 30 and the channel lid 40, when the liquid 500 is reciprocatingly delivered in the microchannel 41. The liquid 500 flowing into the reservoir 3102 is stirred in the reservoir 3102. Stirring the liquid 500 in the reservoir 3102 equalizes the concentrations of active ingredients (for example, a detection target substance and a washing component) of the liquid (specimen, washing liquid, or the like) 500 passing through the microchannel 41, leading to an increased chance of occurrence of various reactions within the microchannel 41, and increased washing effects. Note that the volume and shape of the reservoir 3102 are not particularly limited as long as the liquid 500 can be sufficiently stored at the time of reciprocatingly delivering the liquid 500.

Meanwhile, the prism 20 of the detection chip 10 is formed of a dielectric transparent to the excitation light $\alpha$, and includes the incident surface 21, the film forming surface 22 and the emission surface 23, as illustrated in FIG. 1. The incident surface 21 is a surface for allowing the excitation light $\alpha$ from the excitation light emission unit 110 to become incident on the inside of the prism 20. Moreover, the metal film 30 is arranged on the film forming surface 22, and the excitation light $\alpha$ incident on the inside of the prism 20 is reflected by a back surface of the metal film 30, more specifically, by an interface between the prism 20 and the metal film 30 (film forming surface 22). In contrast, the emission surface 23 is a surface for letting out the reflected light reflected by the film forming surface 22 to the outside of the prism 20.

The shape of the prism 20 is not particularly limited. In the present embodiment, the shape of the prism 20 is a columnar body having a trapezoidal bottom surface. A surface corresponding to one bottom side of the trapezoid is the film forming surface 22, a surface corresponding to one leg is the incident surface 21, and a surface corresponding to the other leg is the emission surface 23. The trapezoid as the bottom surface is preferably an isosceles trapezoid. This shape allows the incident surface 21 and the emission surface 23 to be symmetrical with each other, leading to suppression of the stay of an S wave component of the excitation light $\alpha$ within the prism 20.

The incident surface 21 is formed so as not to allow the excitation light $\alpha$ to return to the excitation light emission unit 110. In a case where the light source of the excitation light $\alpha$ is a laser diode (hereinafter also referred to as "LD"), the return of the excitation light $\alpha$ to the LD would disturb the excited state of the LD and cause fluctuation of the wavelength and output of the excitation light $\alpha$. Accordingly, the angle of the incident surface 21 is set so as to suppress perpendicular incidence of the excitation light $\alpha$ to the incident surface 21 in a scanning range about an ideal resonance angle or enhancement angle as a center. Herein, the "resonance angle" represents an incident angle when the amount of reflected light emitted from the emission surface 23 is minimized in scanning the incident angle of the excitation light $\alpha$ with respect to the metal film 30. Moreover, the "enhancement angle" represents an incident angle when the light amount of scattered light $\gamma$ (hereinafter referred to as "plasmon scattered light") having the same wavelength as the excitation light $\alpha$ emitted above the detection chip 10 is maximized in a case where the incident angle of the excitation light $\alpha$ with respect to the metal film 30 is scanned. In the present embodiment, both the angle between the incident surface 21 and the film forming surface 22 and the angle between the film forming surface 22 and the emission surface 23 are about 80°.

Note that the resonance angle (and the enhancement angle in the immediate vicinity thereof) is roughly determined by the design of the detection chip 10. The design elements are the refractive index of the prism 20, the refractive index of the metal film 30, the film thickness of the metal film 30, the extinction coefficient of the metal film 30, the wavelength of the excitation light $\alpha$, or the like. While the resonance angle and the enhancement angle are shifted by the detection target substance captured on the metal film 30 via the first capture agent, the amount is less than several degrees.

Meanwhile, the prism 20 has a considerable degree of a birefringence characteristic. Examples of materials for the prism 20 include resin and glass. The material of the prism 20 is preferably a resin having a refractive index of 1.4 to 1.6 and a small birefringence.

The metal film 30 is arranged on the film forming surface 22 of the prism 20. With this configuration, interaction (SPR) occurs between the photons of the excitation light $\alpha$ incident on the film forming surface 22 under the total reflection condition and the free electrons in the metal film 30, leading to generation of localized field light (generally referred to as "evanescent light" or "near-field light") on a surface of the metal film 30.

The material of the metal film 30 is not particularly limited as long as it is a metal capable of inducing surface plasmon resonance. Examples of the material of the metal film 30 include gold, silver, copper, aluminum, and alloys of these. The method for forming the metal film 30 is not particularly limited. Examples of the method for forming the metal film 30 include sputtering, vapor deposition, and plating. The thickness of the metal film 30 is not particularly limited, but it is preferably within the range of 30 nm to 70 nm.

Note that the detection chip 10 is usually replaced every time the measurement is performed. While the detection chip 10 is preferably a structure having a length of several millimeters to several centimeters for each, the chip may be a structure smaller or larger than the above, not included in the category of "chip".

Next, the components other than the detection chip 10 of the SPFS apparatus 100 will be described. As described above, the SPFS apparatus 100 includes the excitation light emission unit 110, the fluorescence detection unit 120, the liquid delivery unit 130, the conveyance unit 140, and the control section 150.

The excitation light emission unit 110 emits the excitation light $\alpha$ to the detection chip 10 held by the chip holder 142. In the measurement of the fluorescence $\beta$ or the plasmon scattered light $\gamma$, the excitation light emission unit 110 emits P waves alone for the metal film 30 toward the incident surface 21 so as to allow the incident angle on the metal film 30 to be an angle capable of generating SPR. Here, "excitation light" is light that directly or indirectly excites a fluorescent substance. For example, the excitation light $\alpha$ is light that causes localized field light that excites a fluorescent substance to be generated on the surface of the metal film 30 when the light is applied to the metal film 30 via the prism 20 at an angle at which SPR occurs via the prism 20.

The excitation light emission unit 110 includes a light source unit 111, an angle adjustment mechanism 112, and a light source control section 113.

The light source unit 111 emits excitation light α being collimated and having a constant wavelength and light amount so as to achieve a substantially circular shaped irradiation spot on the back surface of the metal film 30. The light source unit 111 includes, for example, a light source of excitation light α, a beam shaping optical system, an APC mechanism, and a temperature adjustment mechanism (none illustrated).

The type of the light source is not particularly limited, and a laser diode (LD) can be used as an example. Other examples of light sources include light emitting diodes, mercury lamps, and other laser light sources. In a case where the light emitted from the light source is not a beam, the light emitted from the light source is converted into a beam by a lens, a mirror, a slit or the like. In a case where the light emitted from the light source is not monochromatic light, the light emitted from the light source is converted into monochromatic light by a diffraction grating, or the like. Furthermore, in a case where the light emitted from the light source is not linearly polarized light, the light emitted from the light source is converted into linearly polarized light by a polarizer, or the like.

The beam shaping optical system includes, for example, a collimator, a band pass filter, a linear polarization filter, a half wave plate, a slit, a zoom means, or the like. The beam shaping optical system may include all or a portion of them. The collimator collimates the excitation light α emitted from the light source. The band pass filter filters the excitation light α emitted from the light source into narrow band light having a center wavelength alone. This is because the excitation light α from the light source has a slight wavelength distribution width. The linearly polarizing filter filters the excitation light α emitted from the light source into completely linearly polarized light. The half wave plate adjusts a polarization direction of the excitation light α so as to allow the P wave component to be incident on the metal film 30. The slit and the zoom means adjust the beam diameter and outline shape of the excitation light α so as to allow the shape of the irradiation spot on the back surface of the metal film 30 to be a circular shape of a predetermined size.

The APC mechanism controls the light source so as to obtain the constant output of the light source. More specifically, the APC mechanism detects the amount of light branched from the excitation light α, using a photodiode (not illustrated) or the like. Then, the APC mechanism controls the input energy by a regression circuit to control the output of the light source to be constant.

The temperature adjustment mechanism is, for example, a heater or a Peltier element. The wavelength and the energy of the light emitted from the light source might vary depending on the temperature in some cases. For this reason, the temperature of the light source is maintained to be constant by the temperature adjustment mechanism so as to control the wavelength and the energy of the light emitted from the light source to be constant.

The angle adjustment mechanism 112 adjusts the incident angle of the excitation light α with respect to the metal film 30 (interface between the prism 20 and the metal film 30 (film forming surface 22)). In order to apply the excitation light α at a predetermined incident angle toward a predetermined position of the metal film 30 via the prism 20, the angle adjustment mechanism 112 rotates the optical axis of the excitation light α and the chip holder 142 relative to each other.

For example, the angle adjustment mechanism 112 pivots the light source unit 111 about an axis orthogonal to the optical axis of the excitation light α (axis perpendicular to the sheet surface of FIG. 1) At this time, the position of the rotation axis is set so as to substantially suppress a change in the position of the irradiation spot on the metal film 30 even when the incident angle is scanned. With the position of the rotation center set to the vicinity of an intersection of the optical axes of the two excitation light beams α at both ends of the scanning range of the incident angle (between the irradiation position on the film forming surface 22 and the incident surface 21), the shift of the irradiation position can be minimized.

As described above, the angle at which the light amount of the plasmon scattered light γ is maximized among the incident angles of the excitation light α to the metal film 30 is the enhancement angle. With the incident angle of the excitation light α set at or in the vicinity of the enhancement angle, it is possible to measure high-intensity fluorescence β. While the basic incident condition of the excitation light α is determined by the material and shape of the prism 20 of the detection chip 10, the film thickness of the metal film 30, the refractive index of the liquid 500 in the microchannel 41, or the like, an optimum incident condition varies slightly depending on the type and the amount of the fluorescent substance in the microchannel 41, the shape error of the prism 20, or the like. For this reason, it is preferable to determine an optimum enhancement angle for individual measurements.

The light source control section 113 controls various devices included in the light source unit 111 to control the emission of the excitation light α from the light source unit 111. The light source control section 113 includes, for example, a well-known computer or a microcomputer including an arithmetic apparatus, a control apparatus, a storage apparatus, an input apparatus, and an output apparatus.

The fluorescence detection unit 120 detects the fluorescence β generated by the irradiation of the metal film 30 with the excitation light α. Moreover, if necessary, the fluorescence detection unit 120 also detects the plasmon scattered light γ generated by the emission of the excitation light α to the metal film 30. The fluorescence detection unit 120 includes a light receiving unit 121, a position switching mechanism 122, and a sensor control section 123.

The light receiving unit 121 is arranged in the direction normal to the metal film 30 of the detection chip 10. The light receiving unit 121 includes a first lens 124, an optical filter 125, a second lens 126, and a light receiving sensor 127.

The first lens 124 is a condenser lens, for example, and condenses light emitted from above the metal film 30. The second lens 126 is an imaging lens, for example, and focuses the light condensed by the first lens 124 on a light receiving surface of the light receiving sensor 127. The optical path between the both lenses is a substantially parallel optical path. The optical filter 125 is arranged between the both lenses.

The optical filter 125 selectively guides the fluorescent component to the light receiving sensor 127, and removes the excitation light component (plasmon scattered light γ) in order to detect the fluorescence β with a high S (signal)/N (noise) ratio. Examples of the optical filter 125 include an excitation light reflection filter, a short wavelength cut-off filter, and a band pass filter. The optical filter 125 is, for example, a filter including a multilayer film that reflects a predetermined light component, or a color glass filter that absorbs a predetermined light component.

The light receiving sensor 127 detects the fluorescence β and the plasmon scattered light γ. The light receiving sensor 127 has a high sensitivity capable of detecting weak fluorescence β from a minute amount of the detection target substance. The light receiving sensor 127 is, for example, a photomultiplier tube (PMT) or an avalanche photodiode (APD).

The position switching mechanism 122 switches the position of the optical filter 125 to a position on the optical path or outside of the optical path in the light receiving unit 121. Specifically, when the light receiving sensor 127 detects the fluorescence β, the optical filter 125 is arranged on the optical path of the light receiving unit 121, and when the light receiving sensor 127 detects the plasmon scattered light γ, the optical filter 125 is arranged at a position outside of the light receiving unit 121.

The sensor control section 123 controls the detection of an output value of the light receiving sensor 127, the management of the sensitivity of the light receiving sensor 127 according to the detected output value, the change of the sensitivity of the light receiving sensor 127 for obtaining an appropriate output value, or the like. The sensor control section 123 includes, for example, a well-known computer or a microcomputer including an arithmetic apparatus, a control apparatus, a storage apparatus, an input apparatus, and an output apparatus.

The liquid delivery unit 130 supplies various liquids 500 into the liquid injection portion 3101 of the detection chip 10 held by the chip holder 142, and reciprocatingly delivers the liquids. In the present embodiment, for example, a specimen, a washing liquid, a labeling liquid containing a second capture agent labeled with a fluorescent substance (hereinafter also referred to as "labeling liquid") or the like are supplied into the liquid injection portion 3101. The liquid delivery unit 130 includes a liquid chip 131, a syringe pump 132, and a liquid delivery pump drive mechanism 133.

The liquid chip 131 is a container for individually containing a liquid such as a specimen, a washing liquid, a labeling liquid, or the like. The liquid chip 131 is arranged as a chip using each of a plurality of containers being arranged for each of types of the liquid, or as a chip integrating a plurality of containers.

The syringe pump 132 of the liquid delivery unit 130 includes a pipette tip 134 and a plunger 135 capable of reciprocating operation within the syringe pump 132. The reciprocating movement of the plunger 135 quantitatively conducts aspiration and discharge of the liquid 500 from the pipette tip 134. In a case where the pipette tip 134 is replaceable, there is no need to wash the pipette tip 134. This is preferable from the viewpoint of preventing contamination of impurities or the like. In the case where the pipette tip 134 is not replaceable, it is still possible to use the pipette tip 134 without replacing it by adding a configuration for washing the inside of the pipette tip 134.

In the present embodiment, when the pipette tip 134 is inserted into the liquid injection portion 3101 of the detection chip 10, there is a need to hermetically seal the inside of the liquid injection portion 3101. Therefore, it is preferable that a region coming in contact with the liquid injection portion covering sheet 3111 of the channel lid portion 40 of the detection chip 10 among the pipette tip 134 has a fixed outer diameter, and this region preferably has a cylindrical shape. The region not coming in contact with the liquid injection portion covering sheet 3111 need not have a fixed outer diameter and the region may have any shape.

The liquid delivery pump drive mechanism 133 includes a driving apparatus for the plunger 135 and a moving apparatus for the syringe pump 132. The driving apparatus of the plunger 135 is an apparatus for reciprocating the plunger 135, and includes a stepping motor, for example. The driving apparatus including the stepping motor can manage the liquid delivery amount and the liquid delivery speed of the syringe pump 132, and thus, is preferable from the viewpoint of managing the residual liquid amount of the detection chip 10. The apparatus to move the syringe pump 132 freely moves the syringe pump 132 in two directions, that is, the axial direction (for example, the vertical direction) of the pipette tip 134 and the direction crossing the axial direction (for example, the horizontal direction). The apparatus to move the syringe pump 132 includes a robot arm, a biaxial stage or a vertically movable turntable, for example.

The liquid delivery pump drive mechanism 133 drives the syringe pump 132 and the plunger 135 in the syringe pump 132 to aspirate the various liquids 500 from the liquid chip 131. Then, the syringe pump 132 is moved to insert the pipette tip 134 into the liquid injection portion 3101 of the detection chip 10, so as to inject various liquids 500. At this time, as illustrated in FIG. 3A, after the liquid 500 is supplied to the liquid injection portion 3101, the position of the syringe pump 132 (pipette tip 134) in the axial direction is controlled so as to set an end of the pipette tip 134 to be lower than the level of the liquid 500 in the liquid injection portion 3101. Moreover, after the liquid 500 is supplied, the liquid delivery pump drive mechanism 133 moves the pipette tip 134 upward in the axial direction as illustrated in FIG. 3B so as to generate a negative pressure in the liquid injection portion. Then, the plunger 135 is moved in this state to perform either aspiration of the liquid 500, or injection and aspiration of the liquid 500. Then, injection and aspiration of the liquid 500 is repeated to allow reciprocating delivery of the liquid 500 into the microchannel 41. With the reciprocating liquid delivery, it is possible to wash the inside of the microchannel 41, react the first capture agent with the detection target substance in the microchannel 41, and react the detection target substance with a second capture agent labeled with a fluorescent substance.

Moreover, the conveyance unit 140 conveys and fixes the detection chip 10 to a measurement position or a liquid delivery position. Here, the "measurement position" is a position to which the excitation light emission unit 110 emits the excitation light α to the detection chip 10 and at which the fluorescence detection unit 120 detects the fluorescence β or the plasmon scattered light γ generated with the excitation light α. In addition, the "liquid delivery position" is a position at which the liquid delivery unit 130 supplies a liquid into the liquid injection portion 3101 of the detection chip 10 or aspirates (removes) the liquid in the channel 41 of the detection chip 10 from the liquid injection portion 3101. The conveyance unit 140 includes a conveyance stage 141 and the chip holder 142. The chip holder 142 is fixed to the conveyance stage 141 and detachably holds the detection chip 10. The shape of the chip holder 142 is a shape capable of holding the detection chip 10 and that would not obstruct the optical paths of the excitation light α, the fluorescence β and the plasmon scattered light γ. For example, the chip holder 142 includes an opening through which the excitation light α, the fluorescence β and the plasmon scattered light γ pass. The conveyance stage 141 moves the chip holder 142 in one direction and in its opposite direction. The conveyance stage 141 is also shaped so as not to obstruct the optical paths of the excitation light α, the fluorescence β and the plasmon scattered light γ. The conveyance stage 141 is driven by a stepping motor, or the like.

The control section 150 controls the angle adjustment mechanism 112, the light source control section 113, the position switching mechanism 122, the sensor control section 123, the liquid delivery pump drive mechanism 133, and the conveyance stage 141. The control section 150 includes, for example, a well-known computer or a microcomputer including an arithmetic apparatus, a control apparatus, a storage apparatus, an input apparatus, and an output apparatus.

(Method for Delivering Liquid to Detection Chip)

Figure 5A:
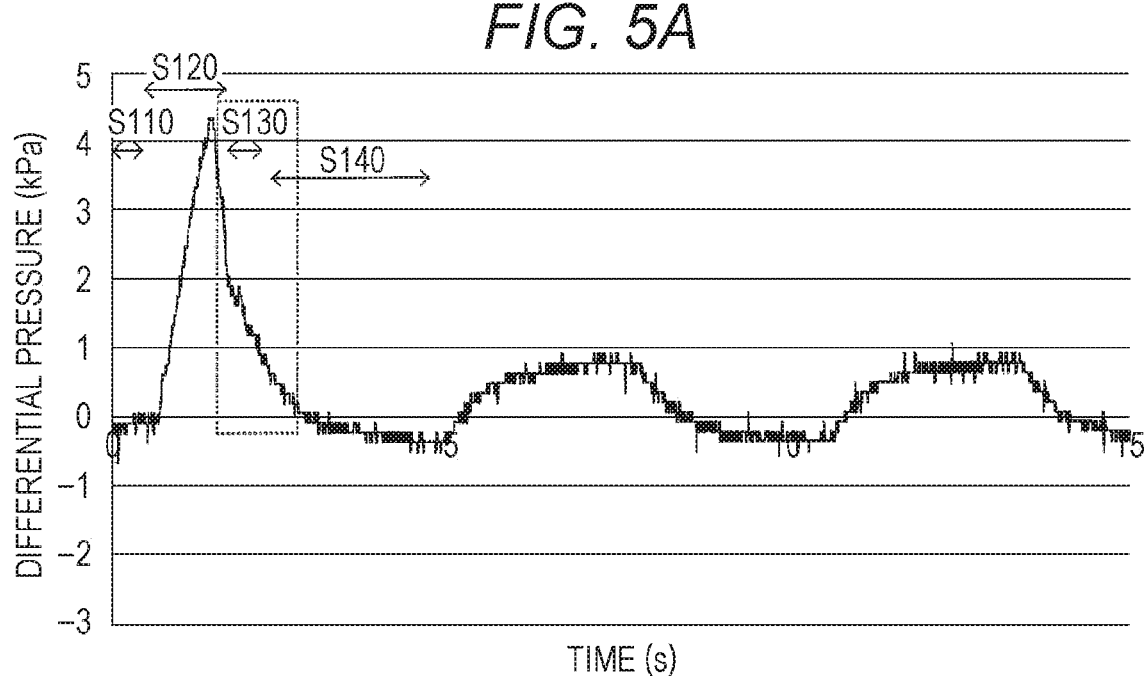
FIG. 5A is a graph illustrating a relationship between an elapsed time (horizontal axis) and a pressure (vertical axis) in a liquid injection portion in implementation of a liquid delivery method according to an embodiment of the present invention.

Next, a method of delivering various liquids 500 to the detection chip 10 will be described. FIG. 4 is a flowchart illustrating an exemplary operation procedure of the SPFS apparatus 100 when the detection method of the present embodiment is implemented. FIG. 5A illustrates a relationship between the passage of time (horizontal axis) and the pressure (vertical axis) in the liquid injection portion 3101 when the liquid delivery method of the present embodiment is performed. Note that the value on the vertical axis in FIG. 5A is the differential pressure when the pressure inside the liquid injection portion 3101 at the time of insertion of the pipette tip is defined as a reference (0 kPa).

First, the liquid delivery pump drive mechanism 133 of the SPFS apparatus 100 drives the syringe pump 132 and the plunger 135 in the syringe pump 132 to aspirate the various liquids 500 from the liquid chip 131. Then, the pipette tip 134 is inserted into the liquid injection portion 3101 of the detection chip 10 (step S110). At this time, as illustrated in FIG. 3A, after the liquid 500 is supplied, the insertion position of the pipette tip 134 is controlled so as to set an end of the pipette tip 134 to be lower than the level of the liquid 500 injected into the liquid injection portion 3101. Note that as illustrated in FIG. 5A, even when the pipette tip 134 is inserted into the liquid injection portion 3101, the pressure inside the liquid injection portion 3101 hardly changes since the reservoir covering sheet 3112 has the vent 3113.

Subsequently, the liquid delivery pump drive mechanism 133 drives the plunger 135 to supply a desired amount of the liquid 500 from the pipette tip 134 into the liquid injection portion 3101 (step S120). This applies a pressure to the inside of the liquid injection portion 3101 so as to allow the liquid 500 to flow from the liquid supply unit 3101 into the microchannel 41, as illustrated in FIG. 5A. In this case, all or a portion of the liquid 500 may be dispensed.

Figure 5B:
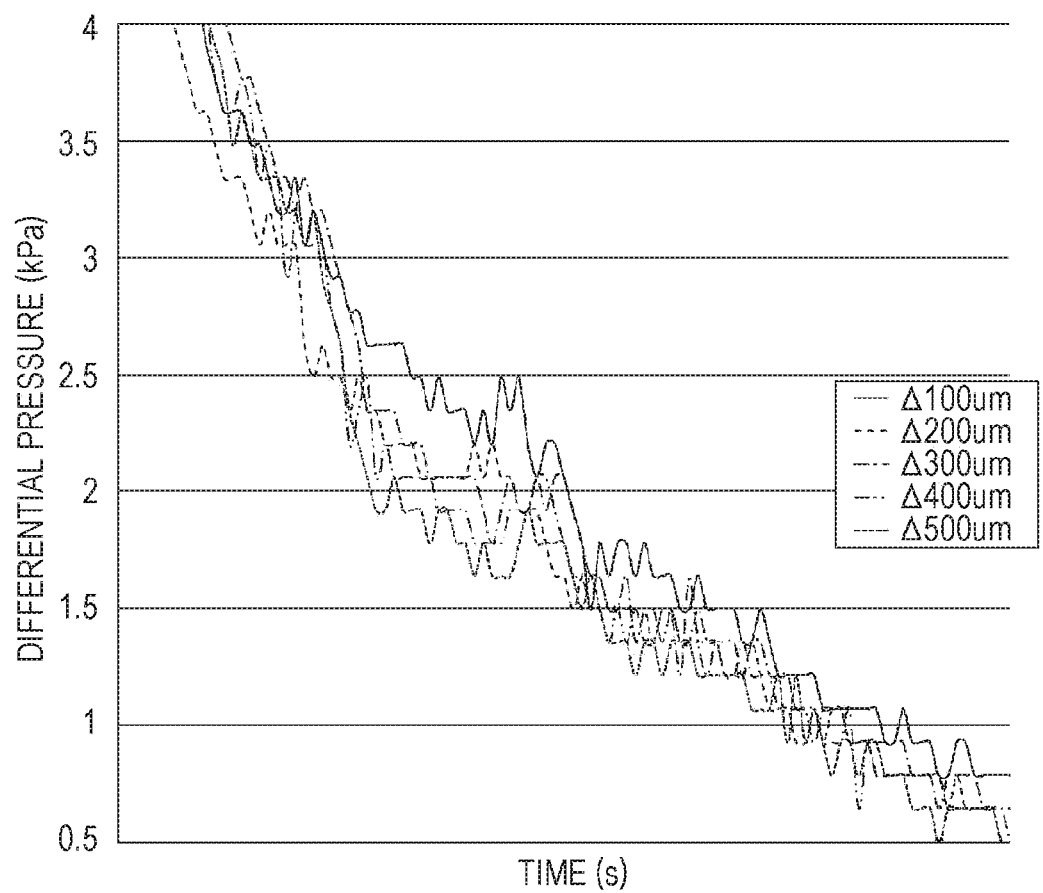
FIG. 5B is an enlarged view of a region within a dotted frame of FIG. 5A, being a graph illustrating a relationship between an upward movement amount in an axial direction of a pipette tip and a pressure in a liquid injection portion, in a step of raising the liquid level.

Thereafter, the liquid delivery pump drive mechanism 133 controls the position in the axial direction of the syringe pump 132, and moves the pipette tip 134 upward in the axial direction while maintaining the hermetically sealed state inside the liquid injection portion. With this processing, as illustrated in FIG. 5A, a negative pressure is generated in the liquid injection portion 3101, so as to raise the level of the liquid 500 in the liquid injection portion 3101 (step S130). Moreover, as illustrated in FIG. 3A, this processing increases a distance from the end of the pipette tip 134 to the liquid level (height represented by h2 in FIG. 3B) to be longer than a distance from the end of the pipette tip 134 to the liquid level (height represented by h1 in FIG. 3A) before generation of the negative pressure. That is, the end of the pipette tip 134 is sufficiently buried in the liquid 500. Now, FIG. 5B illustrates a relationship between the upward movement amount of the pipette tip 134 in the axial direction and the pressure change in the liquid injection portion 3101 during the step (step S130) of raising the level of the liquid 500. Note that FIG. 5B is an enlarged view of the region within the dotted frame in FIG. 5A, and the value on the vertical axis in FIG. 5B is the differential pressure when the pressure inside the liquid injection portion 3101 at the time of insertion of the pipette tip 134 is defined as a reference (0 kPa). As illustrated in FIG. 5B, the more the upward movement of the pipette tip 134 in the axial direction, the larger negative pressure is generated, leading to a lowered pressure in the liquid injection portion 3101. As a result, the liquid level rises more and the end of the pipette tip 134 is more likely to be buried in the liquid 500. Then, this would suppress aspiration of air together with the liquid 500 in the step of aspirating the liquid 500 described below. In the present embodiment, the pipette tip 134 is moved upward in the axial direction up to 1000 μm. Note that from the viewpoint of sufficiently generating a negative pressure, it is more preferable that the movement distance to the upper side in the axial direction of the pipette tip 134 is 100 μm to 500 μm. Moreover, from the viewpoint of appropriately raising the liquid level, it is preferable that the amount of depressurization inside the liquid injection portion caused by the movement of the pipette tip 134 be 1.0 kPa or less.

Subsequently, the liquid delivery pump drive mechanism 133 drives the plunger 135 to aspirate the liquid 500 in the liquid injection portion 3101 with the pipette tip 134, or to inject and aspirate the liquid 500 by the pipette tip 134 (step S140). When the liquid 500 is aspirated, all of the liquid in the liquid injection portion 3101 may be aspirated, or solely a portion thereof may be aspirated. Moreover, in step S120, when solely a portion of the liquid 500 in the pipette tip 134 is dispensed, the liquid 500 remains in the pipette tip 134. Accordingly, the liquid 500 remaining in the pipette tip 134 may be dispensed in this step.

Then, the dispensation and aspiration of the liquid (step S140) is repeated a necessary number of times, and the liquid 500 is reciprocatingly delivered in the microchannel 41. With this processing, it is possible, for example, to bind the detection target substance to the first capture agent, wash the microchannel, and further bind the second capture agent to the detection target substance bound to the first capture agent. In addition, execution of reciprocal liquid delivery makes it possible to stir the liquid in the pipette tip 134 or the reservoir 3102 so as to equalize the concentration of the liquid provided in the microchannel 41, or to promote the reaction (antigen-antibody reaction, for example) in the microchannel 41.

Finally, the liquid delivery pump drive mechanism 133 drives the plunger 135 to aspirate the liquid in the liquid injection portion 3101, the microchannel 41, and the reservoir 3102. Thereafter, the pipette tip 134 is moved from the liquid injection portion 3101 to discharge the liquid 500 to the liquid chip 131 or the like.

(Detection Method)

Figure 6:
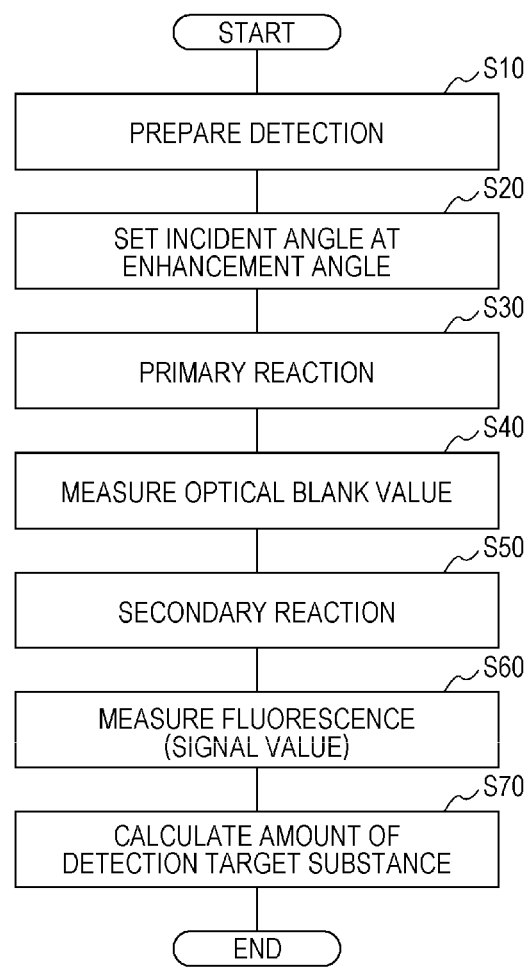
FIG. 6 is a flowchart of a detection method according to an embodiment of the present invention, being a flowchart illustrating an exemplary operation procedure of a detection apparatus.

Subsequently, a method for detecting a detection target substance using the above-described detection apparatus (detection system) will be described. FIG. 6 is a flowchart illustrating an exemplary operation procedure of the SPFS apparatus 100 when the detection method of the present embodiment is implemented.

First, preparation for detection is performed (step S10). Specifically, the above-described detection chip 10 is installed in the chip holder 142 of the SPFS apparatus 100. Moreover, in a case where a moisturizing agent is present in the channel 41 of the detection chip 10, the inside of the channel 41 is washed to remove the moisturizing agent.

Next, the incident angle of the excitation light α with respect to the metal film 30 (film forming surface 22) of the detection chip 10 is set at the enhancement angle (step S20). Specifically, the control section 150 controls the conveyance stage 141 to move the detection chip 10 from the installation position to the detection position. Thereafter, the control section 150 controls the light source control section 113 and the angle adjustment mechanism 112 to scan the incident angle of the excitation light α with respect to the metal film 30 (film forming surface 22) while emitting the excitation light α from the light source unit 111 to a predetermined position of the metal film 30 (film forming surface 22). At this time, the control section 150 controls the position switching mechanism 122 to move the optical filter 125 to the outside of the optical path of the light receiving unit 121. Together with this, the control section 150 controls the sensor control section 123 to detect the plasmon scattered light γ by the light receiving sensor 127. The control section 150 obtains data including the relationship between the incident angle of the excitation light a and the intensity of the plasmon scattered light γ. Then, the control section 150 analyzes the data and determines an incident angle (enhancement angle) at which the intensity of the plasmon scattered light γ is maximized. Finally, the control section 150 controls the angle adjustment mechanism 112 to set the incident angle of the excitation light α with respect to the metal film 30 (film forming surface 22) at the enhancement angle.

Note that while the enhancement angle is determined by the material and shape of the prism 20, the thickness of the metal film 30, the refractive index of the liquid in the channel 41, or the like, the enhancement angle would slightly vary due to various factors such as the type and amount of the liquid in the microchannel 41, and the shape error of the prism 20. For this reason, it is preferable to determine the enhancement angle every time the detection is performed. The enhancement angle is determined on the approximate order of 0.1°.

Subsequently, a specimen is supplied to the microchannel 41 of the detection chip 10 by the above-described liquid delivery method, and the detection target substance contained in the specimen is specifically bound to the first capture agent immobilized on the metal film 30 in the detection chip 10 (primary reaction (step S30)). Note that after binding of the detection target substance, a buffer solution or the like is supplied into the microchannel 41 by the above-described liquid delivery method, and the inside of the microchannel 41 is washed to remove free detection target substances or the like.

Herein, the types of specimens and detection target substances to be supplied to the microchannel 41 in the present embodiment are not particularly limited. Examples of specimens include body fluids such as blood, serum, plasma, urine, nostrils, saliva, semen and diluents thereof. Examples of the detection target substance contained in these specimens include nucleic acids (DNA, RNA, etc.), proteins (polypeptides, oligopeptides, etc.), amino acids, carbohydrates, lipids and modified molecules thereof.

After the primary reaction, an optical blank value is measured (step S40). Specifically, the control section 150 controls the conveyance stage 141 to move the detection chip 10 from the installation position to the detection position. Thereafter, the control section 150 controls the light source control section 113 to cause the light source unit 111 to emit the excitation light α at the enhancement angle toward the metal film 30 (film forming surface 22). At the same time, the control section 150 controls the sensor control section 123 to detect the amount of light by the light receiving sensor 127, and records it as a blank value.

Subsequently, a second capture agent labeled with a fluorescent substance is bound to the detection target substance bonded to the first capture agent on the metal film 30 (secondary reaction (step S50)). Specifically, the control section 150 controls the conveyance stage 141 to move the detection chip 10 from the detection position to the liquid delivery position. Thereafter, the control section 150 controls the liquid delivery pump drive mechanism 133 to supply the labeling liquid containing the second capture agent into the microchannel 41 by the above-described liquid delivery method. Note that the second capture agent is a substance which specifically binds to a site of the detection target substance, different from a site to which the first capture agent specifically binds. In addition, a fluorescent substance is bound to the second capture agent. Therefore, supplying the labeling liquid to the microchannel 41 allows the second capture agent to be specifically bound to the detection target substance bound to the first capture agent, leading to labeling of the detection target substance indirectly with the fluorescent substance. Note that after the labeling of the detection target substance with the fluorescent substance, a buffer solution or the like is supplied into the microchannel 41 by the above-described liquid delivery method, and the inside of the microchannel 41 is washed to remove a free second capture agent, or the like.

Herein, the second capture agent may be a substance that specifically binds to a site different from the site where the first capture agent specifically binds to the detection target substance, and thus may be a biomolecule or a fragment thereof specific to the detection target substance. In addition, the second capture agent may be formed with one molecule or may be a complex in which two or more molecules are combined.

Next, in a state where the detection target substance labeled with a fluorescent substance is arranged on the bottom surface (the metal film 30) of the microchannel 41 via the first capture agent, the excitation light α is emitted to the metal film 30 (film forming surface 22) via the prism 20 at the enhancement angle. Then, a fluorescence value from the fluorescent substance labeling the detection target substance is measured (measurement step (step S60)). Specifically, the control section 150 controls the conveyance stage 141 to move the detection chip 10 from the liquid delivery position to the detection position. Thereafter, the control section 150 controls the light source control section 113 to cause the light source unit 111 to emit the excitation light α toward the metal film 30 (film forming surface 22). At the same time, the control section 150 controls the sensor control section 123 to detect the amount of light having the same wavelength as the fluorescence β by the light receiving sensor 127.

Finally, the presence or amount of the detection target substance is calculated (step S70). The fluorescence value mainly includes a fluorescent component (signal value) derived from a fluorescent substance that labels a detection target substance, and an optical blank value. Accordingly, the control section 150 can calculate a signal value correlated with the amount of detection target substance by subtracting the optical blank value obtained in step S40 from the fluorescence value obtained in step S60. Then, the signal value is converted into the amount or concentration of the detection target substance by the calibration curve prepared in advance.

OTHER EMBODIMENTS

While the above-described liquid delivery method has described a mode in which a negative pressure is generated by moving the pipette tip 134 upward in the axial direction in the step (step S130) of generating a negative pressure in the liquid injection portion 3101, it is also possible to generate the negative pressure in the liquid injection portion 3101 by other methods such as deforming the liquid injection portion covering sheet 3111 of the channel lid 40.

Figure 7:
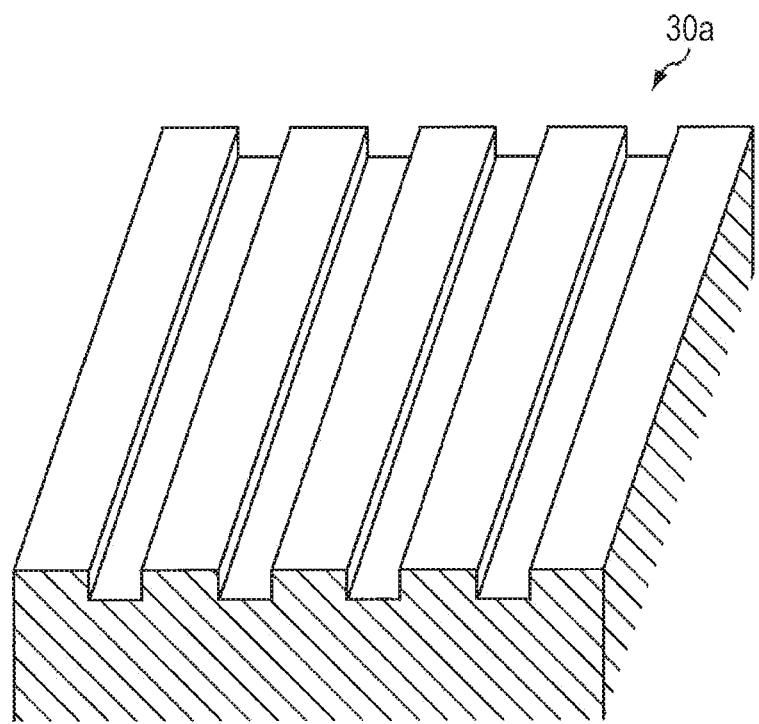
FIG. 7 is a perspective view of a metal film including a diffraction grating.
Figure 8:
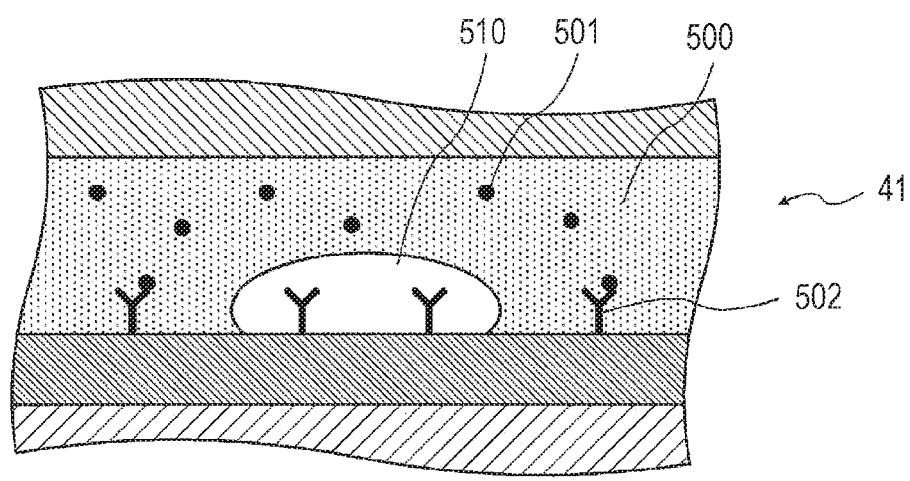
FIG. 8 is a schematic diagram for illustrating a conventional liquid delivery method.
Figure 9C:
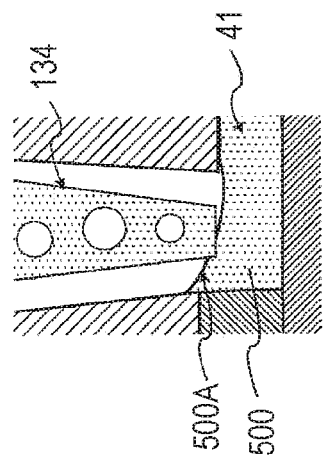
FIG. 9 is a schematic diagram for illustrating a conventional liquid delivery method.
Figure 9B:
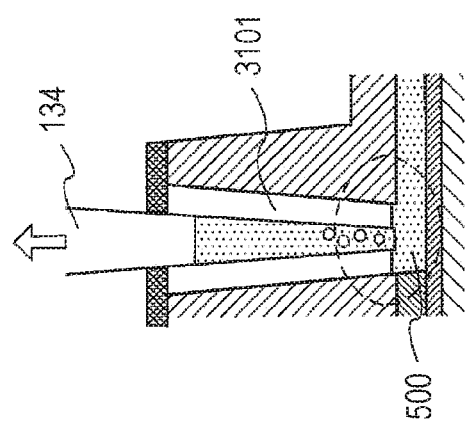
Figure 9A:
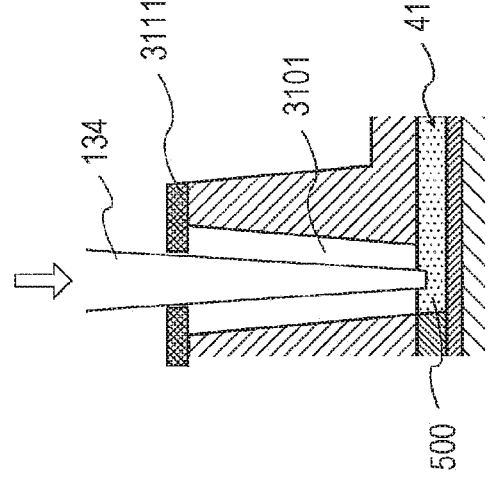

Moreover, the above description is a case of the prism coupling (PC)-SPFS (detection method) and the detection apparatus that uses the prism 20 having the metal film 30 formed thereon to bind (couple) photons to surface plasmons. The detection method and the detection chip according to the present invention, however, are not limited to this mode. FIG. 7 is a perspective view of a metal film 30a including a diffraction grating. As illustrated in FIG. 7, the detection method and the detection apparatus according to the present invention may use a detection chip having a metal film 30a including a diffraction grating. In this case, it is also possible to bind the photons to the surface plasmons so as to emit the plasmon scattered light γ from the metal film 30a. In this case, the prism 20 is not needed. Moreover, the excitation light emission unit 110 is arranged on the metal film 30a side of a detection chip, and emits the excitation light α toward the diffraction grating in the step of detecting the fluorescence β, and the step of detecting the plasmon scattered light γ.

Moreover, while the above-described embodiment has described the detection method and the detection apparatus using the SPFS apparatus, the detection method and the detection apparatus are not limited thereto. The detection method for the detection target substance can also be applied to ELISA method, RIfS method, SPR method, QCM, or the like.

Effects

As described above, when various liquids are reciprocatingly delivered to the microchannel by an ordinary liquid delivery method, bubbles easily enter the pipette tip at the time of aspiration of the liquid. When the liquid is supplied again from the pipette tip into the microchannel, the bubbles easily enter the microchannel together with the liquid. Then, entrance of the bubbles into the microchannel is likely to decrease the detection accuracy of the detection target substance, or the like. In contrast, with the reciprocating liquid delivery of various liquids into the microchannel using the liquid delivery method of the present embodiment, it is possible to suppress entrance of bubbles during aspiration of the liquid, and thus, suppress entrance of air into the microchannel even when the liquid is supplied again. This makes it possible to detect the detection target substance with high accuracy.

INDUSTRIAL APPLICABILITY

With the liquid delivery method, the detection system, and the detection apparatus according to the present invention, it is possible to perform reciprocate delivery of various liquids without bringing air to enter the microchannel. This makes it very useful as a detection apparatus for detecting various types of detection target substances, and a method for delivering a specimen or the like to the detection apparatus.

REFERENCE SIGNS LIST

10 Detection chip
20 Prism
21 Incident surface
22 Film forming surface
23 Emission surface
30 Metal film
40 Channel lid
41 Microchannel
100 SPFS apparatus
110 Excitation light emission unit
111 Light source unit
112 Angle adjustment mechanism
113 Light source control section
120 Fluorescence detection unit
121 Light receiving unit
122 Position switching mechanism
123 Sensor control section
124 First lens
125 Optical filter
126 Second lens
127 Light receiving sensor
130 Liquid delivery unit
131 Liquid chip
132 Syringe pump
133 Liquid delivery pump drive mechanism
134 Pipette tip
135 Plunger
140 Conveyance unit
141 Conveyance stage
142 Chip holder
150 Control section
500 Liquid
3101 Liquid injection portion
3102 Reservoir
3110 Frame
3111 Liquid injection portion covering sheet
3112 Reservoir covering sheet
α Excitation light
β Fluorescence
γ Plasmon scattered light

The invention claimed is:

1. A liquid delivery method of first inserting a pipette tip into a liquid injection portion of a detection chip including: a microchannel; the liquid injection portion connected to one end of the microchannel for injecting a liquid; and a reservoir connected to the other end of the microchannel for temporarily storing the liquid, the insertion being performed to achieve a hermetically sealed state of the liquid injection portion, then injecting and aspirating the liquid by the pipette tip to reciprocatingly deliver the liquid into the microchannel, the method comprising executing, in this order:
inserting the pipette tip into the liquid injection portion up to a position at which an end of the pipette tip comes below a liquid level when the liquid is injected into the liquid injection portion;
injecting the liquid from the pipette tip into the liquid injection portion;
generating a negative pressure in the liquid injection portion to raise the level of the liquid in the liquid injection portion; and
performing either aspiration of the liquid in the liquid injection portion by the pipette tip, or injection of the liquid into the liquid injection portion by the pipette tip and aspiration of the liquid inside the liquid injection portion,
wherein the raising the level of the liquid in the liquid injection portion includes raising the pipette tip in the axial direction to generate the negative pressure in the liquid injection portion.

2. The liquid delivery method according to claim 1,
wherein the inner diameter of the liquid injection portion is 10 mm or less, and the outer diameter of the pipette tip is 1 mm or more and less than 10 mm.

3. The liquid delivery method according to claim 1,
wherein the inner diameter of the liquid injection portion is 10 mm or less, and the outer diameter of the pipette tip is 1 mm or more and less than 10 mm.

4. The liquid delivery method according to claim 1, wherein the level of the liquid in the liquid injection portion is raised while a level of the liquid in the pipette tip is unchanged.

5. A detection system comprising:
a detection chip including a microchannel, a liquid injection portion connected to one end of the microchannel for injecting a liquid, and a reservoir connected to the other end of the microchannel for temporarily storing the liquid;
a pipette tip that injects the liquid into the liquid injection portion and aspirates the liquid from the liquid injection portion; and
a liquid delivery pump drive mechanism that controls injection and aspiration of the liquid by the pipette tip,
wherein the pipette tip is inserted to achieve a hermetically sealed state inside the liquid injection portion and achieve a state where an end of the pipette tip comes below a level of the liquid injected into the liquid injection portion, and
the liquid delivery pump drive mechanism raises the pipette tip in the axial direction while maintaining the hermetically sealed state in the liquid injection portion after injecting the liquid from the pipette tip to the liquid injection portion, so as to raise the level of the liquid in the liquid injection portion, and then, performs either aspiration of the liquid in the liquid injection portion by the pipette tip, or injection of the liquid into the liquid injection portion by the pipette tip and aspiration of the liquid inside the liquid injection portion,
wherein the raising the level of the liquid in the liquid injection portion includes raising the pipette tip in the axial direction to generate a negative pressure in the liquid injection portion.

6. A detection apparatus comprising:
a chip holder that can hold a detection chip including a microchannel, a liquid injection portion connected to one end of the microchannel for injecting a liquid, and a reservoir connected to the other end of the microchannel for temporarily storing the liquid;
a pipette tip that injects the liquid into the liquid injection portion of the detection chip held by the chip holder and aspirates the liquid from the liquid injection portion; and
a liquid delivery pump drive mechanism that controls injection and aspiration of the liquid by the pipette tip,
wherein the pipette tip is inserted to achieve a hermetically sealed state inside the liquid injection portion and achieve a state where an end of the pipette tip comes below a level of the liquid injected into the liquid injection portion, and
the liquid delivery pump drive mechanism raises the pipette tip in the axial direction while maintaining the hermetically sealed state in the liquid injection portion after injecting the liquid from the pipette tip to the liquid injection portion, so as to raise the level of the liquid in the liquid injection portion, and then, performs either aspiration of the liquid in the liquid injection portion by the pipette tip, or injection of the liquid into the liquid injection portion by the pipette tip and aspiration of the liquid inside the liquid injection portion,
wherein the raising the level of the liquid in the liquid injection portion includes raising the pipette tip in the axial direction to generate a negative pressure in the liquid injection portion.

* * * * *